United States Patent [19]

Bowers

[11] Patent Number: 4,800,291
[45] Date of Patent: Jan. 24, 1989

[54] ELECTRONIC CIRCUIT FOR CONTROL OF A VOLTAGE REGULATOR OF AN ELECTRICAL GENERATOR

[75] Inventor: Jack R. Bowers, Madison, Ill.

[73] Assignee: Basler Electric Company, Highland, Ill.

[21] Appl. No.: 21,906

[22] Filed: Mar. 4, 1987

[51] Int. Cl.[4] .......................... H02J 3/00; H02H 3/00
[52] U.S. Cl. ..................................... 307/87; 307/84; 361/62; 361/86
[58] Field of Search ............. 307/87, 127, 129, 85, 307/86, 139, 153, 84; 361/62, 86

[56] References Cited

U.S. PATENT DOCUMENTS

| | | | |
|---|---|---|---|
| 3,069,555 | 12/1962 | Kessler | 307/87 |
| 3,069,556 | 12/1962 | Apfelbeck et al. | 307/87 |
| 3,343,001 | 9/1967 | Grimsdale et al. | 307/87 |
| 3,399,310 | 8/1968 | Vogler et al. | 307/87 |
| 3,466,456 | 9/1969 | Tolworthy | 307/87 |
| 3,491,248 | 1/1970 | Beckwith et al. | 307/87 |
| 3,539,820 | 11/1970 | Kessler | 307/87 |
| 3,551,746 | 12/1970 | Rubner | 307/87 X |
| 3,553,596 | 1/1971 | Thompson et al. | 328/155 |
| 3,555,401 | 1/1971 | Bayer et al. | 322/32 |
| 3,562,545 | 2/1971 | Rubner et al. | 307/87 |
| 3,609,388 | 9/1971 | Hemmenway | 307/87 |
| 3,646,356 | 2/1972 | Hoffman | 307/87 |
| 3,675,037 | 7/1972 | Hamilton | 307/51 |
| 3,683,199 | 8/1972 | Billings et al. | 307/87 |
| 3,723,888 | 3/1973 | Ellis | 328/134 |
| 3,748,489 | 7/1973 | South | 307/87 |
| 3,753,002 | 8/1973 | Jacobson et al. | 307/87 |
| 3,801,796 | 4/1974 | Konrad | 307/87 |
| 3,864,620 | 2/1975 | Abbondanti | 321/27 |
| 3,892,978 | 7/1975 | Haley | 307/87 |
| 3,908,132 | 9/1975 | Krampe et al. | 307/87 |
| 3,916,291 | 10/1975 | Raczkowski | 322/19 |
| 3,975,646 | 8/1976 | Kilgore et al. | 307/21 |
| 3,999,115 | 12/1976 | South et al. | 322/25 |
| 4,031,407 | 6/1977 | Reed | 307/87 |
| 4,074,180 | 2/1978 | Sharpe et al. | 322/29 |
| 4,090,090 | 5/1978 | Johnston | 307/87 |
| 4,096,394 | 7/1978 | Ullmann et al. | 307/46 |
| 4,096,395 | 6/1978 | Bogel et al. | 307/70 |
| 4,104,539 | 8/1978 | Hase | 307/64 |
| 4,118,635 | 10/1978 | Barrett et al. | 290/40 R |
| 4,121,111 | 10/1978 | Crisafulli | 307/87 |
| 4,249,088 | 2/1981 | Kleba et al. | 307/87 |
| 4,256,972 | 3/1981 | Wyatt et al. | 307/87 X |
| 4,270,156 | 4/1981 | Fry | 361/21 |
| 4,308,465 | 12/1981 | Lafuze | 307/87 |
| 4,311,919 | 1/1982 | Nail | 307/64 |
| 4,322,630 | 3/1982 | Mezera et al. | 290/40 |
| 4,328,429 | 5/1982 | Kublick | 307/58 |
| 4,333,021 | 6/1982 | Cresap et al. | 307/87 |
| 4,344,027 | 8/1982 | Karlicek | 322/7 |
| 4,362,950 | 12/1982 | Turner | 307/45 |
| 4,384,213 | 5/1983 | Bogel | 307/64 |
| 4,405,867 | 9/1983 | Moakler et al. | 307/64 |
| 4,536,126 | 8/1985 | Reuther | 290/40 R |
| 4,575,671 | 3/1986 | Lee et al. | 322/16 |

Primary Examiner—William M. Shoop, Jr.
Assistant Examiner—Sharon D. Logan
Attorney, Agent, or Firm—Senniger, Powers, Leavitt and Roedel

[57] ABSTRACT

An electronic circuit for use with an electrical generator having a voltage regulator which responds to raise or lower control signals to change the voltage output of the generator. The electronic circuit has a circuit for sensing the magnitude of the difference between the voltage output of the generator and the voltage of a bus to which the generator is to be connected. The electronic circuit also includes a circuit for generating control pulses, each control pulse having a fixed maximum pulse duration when the magnitude of the difference is greater than a first predetermined value but which decreases with a decreasing magnitude of difference down to a fixed minimum pulse duration at a second and lesser predetermined magnitude of difference when the magnitude sensed is less than the first predetermined value. The pulses of the minimum pulse duration are generated for magnitudes less than the second predetermined value, whereby the control pulses produce the raise or lower control signals for the voltage regulator to cause the voltage output of the generator to approach the voltage of the bus.

20 Claims, 9 Drawing Sheets

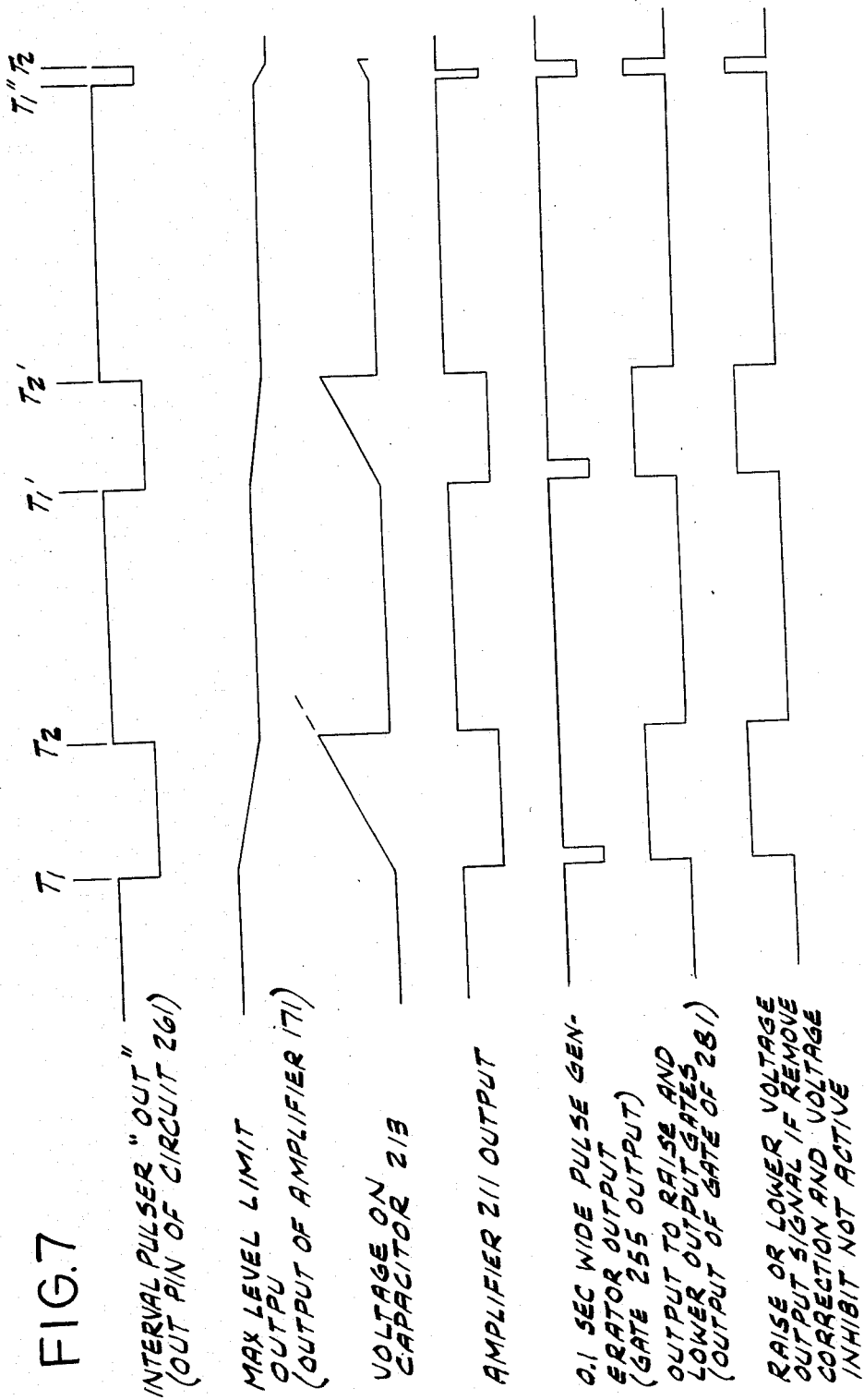

4,800,291

ELECTRONIC CIRCUIT FOR CONTROL OF A VOLTAGE REGULATOR OF AN ELECTRICAL GENERATOR

BACKGROUND OF THE INVENTION

This invention relates to an electronic circuit for use with an electrical generator having a voltage regulator which responds to raise or lower control signals to change the generator output voltage to approach the voltage of a bus to which the generator is to be connected.

When an electrical generator is to be connected to an energized electrical system, the generator voltage, frequency and phase angle must be matched to the those of the electrical system. While electrical apparatus is presently available which will accomplish this matching prior to closing the generator breaker the time required to match the generator voltage to the electrical system voltage (i.e., bus voltage) is very often excessive.

For example, some presently available circuits will provide a continuous raise or lower signal until the difference between the generator voltage and bus voltage is adjusted to within permissible limits. If a continuous raise signal was being applied (i.e., the generator voltage was too low), the generator voltage may overshoot the desired value and hunt for some time before a voltage match is attained.

Some voltage matching systems have attempted to solve this overshooting and hunting problem by periodically providing raise or lower control signals which are pulses having a varying duration. For example, the pulses will have a settable pulse width or duration produced when the voltage difference is above a predetermined magnitude (e.g., 20 volts). When the voltage difference is below this predetermined magnitude, the pulse width will linearly decrease until the voltage difference reaches another predetermined magnitude (e.g., one volt) below which magnitude pulses will no longer be provided. Thus, below this latter predetermined magnitude, the generator voltage is not controlled and may not reach an acceptable level. The generator voltage disadvantageously will not be "fine tuned" and thus one may not attain the desired close match between the generator and bus voltage.

SUMMARY OF THE INVENTION

Among the several objects of the invention may be noted the provision of an electronic circuit for producing control pulses which can be used to produce the raise or lower control signals to the voltage regulator of an electrical generator to adjust the generator voltage to closely match the voltage of a bus to which the generator is to be connected; the provision of such electronic circuit which reduces hunting and overshooting; the provision of such electronic circuit which reduces the time required for matching the generator voltage to the bus voltage; the provision of such an electronic circuit which provides positive control of the generator voltage when the bus and generator voltages are close; the provision of such an electronic circuit which will "fine tune" the generator voltage to the bus voltage and produce the desired close match; and the provision of such an electronic circuit which is reliable in operation and economical in cost.

Briefly an electronic circuit of the present invention is for use with an electrical generator having a voltage regulator which responds to raise or lower control signals to change the voltage output of the generator. The electronic circuit has a circuit for sensing the magnitude of the difference between the voltage output of the generator and the voltage of a bus to which the generator is to be connected. The electronic circuit also includes a circuit for generating control pulses, each control pulse having a fixed maximum pulse duration when the magnitude of the difference is greater than a first predetermined value but which decreases with a decreasing magnitude of difference down to a fixed minimum pulse duration at a second and lesser predetermined magnitude of difference when the magnitude sensed is less than the first predetermined value. The pulses of the minimum pulse duration are generated for magnitudes less than the second predetermined value, whereby the control pulses produce the raise or lower control signals for the voltage regulator to cause the voltage output of the generator to approach the voltage of the bus.

Other objects and features will be in part apparent and in part pointed out hereinafter.

BRIEF DESCRIPTION OF THE DRAWINGS

FIG. 7 is a timing diagram for the circuit shown in FIGS. 4A and 4B.

Corresponding reference characters indicate corresponding parts throughout the several views of the drawings.

DETAILED DESCRIPTION OF A PREFERRED EMBODIMENT

Figure 1:
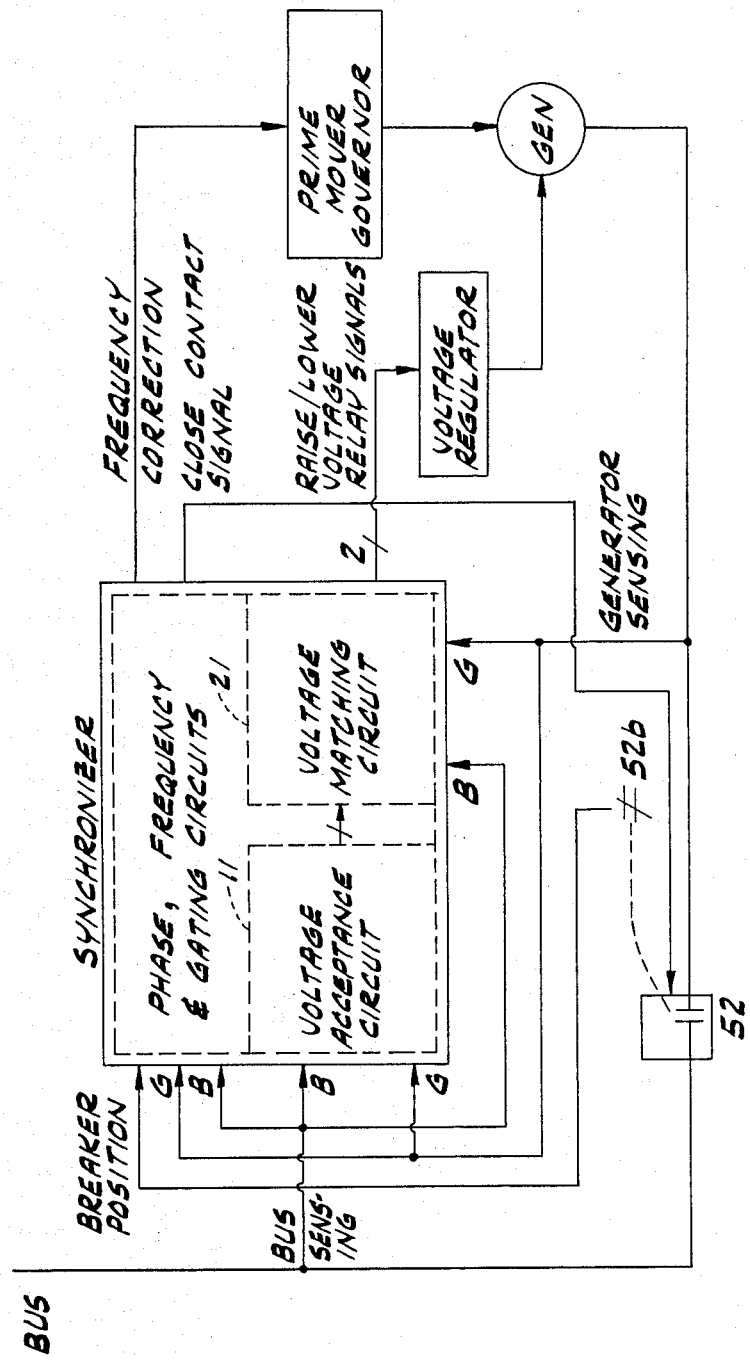
FIG. 1 is a block diagram representation showing the connection of a synchronizer circuit which includes the electronic circuit of the present invention.

Referring to FIG. 1, a Synchronizer senses both the voltage on a generator GEN and on a bus BUS to which the generator is to be connected. These voltages are sensed, for example, by transformers connected with their primary winding to the corresponding GEN and BUS Voltage Sensing. A circuit breaker 52 is initiated by operating a close contact. The Synchronizer determines the phase, frequency and voltage relationship between the generator and bus voltages and when the requisite conditions are met (i.e., the phase, frequency and voltage are within settable front panel limits), initiates a Closure Contact Signal to the breaker 52. The circuit Breaker Position is monitored using back contact 52b.

In order to achieve these requiste conditions for closing the circuit breaker, the Synchronizer provides signals for correcting the generator voltage. Phase, Frequency and Gating circuits provide Frequency Correction signals to a Prime Mover Governor of the generator. A Voltage Acceptance Circuit 11 and Voltage Matching Circuit 21 produce voltage correction control signals i.e., Raise/Lower Voltage Relay Signals to the Voltage Regulator of the generator to adjust the generator voltage.

After the circuit breaker Close Contact Signal is produced by the Synchronizer, the voltage and frequency correction signals are held constant until the breaker has been recognized as being closed (monitoring of 52b). When recognized as closed, the voltage and frequency correction signals are removed or stopped.

Figure 2:
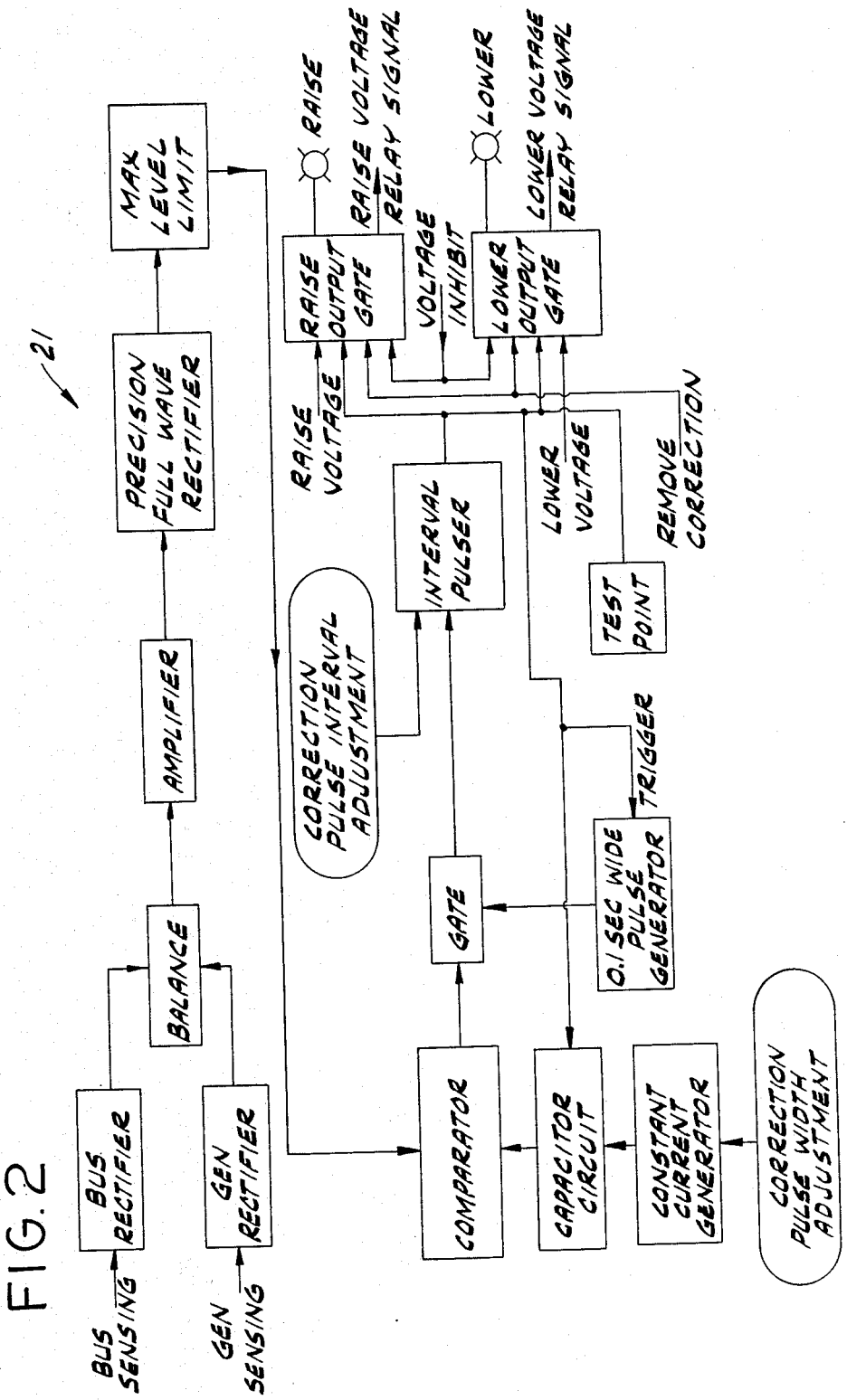
FIG. 2 is a block diagram representation of a Voltage Matching Circuit included in FIG. 1.

Referring to FIG. 2, a block diagram of the Voltage Matching Circuit 11 includes a Bus Rectifier and Generator Rectifier circuit each of which rectifies the corresponding bus and generator voltages. The rectified bus voltage is a positive dc signal and the recitified generator voltage is a negative dc signal. Each of the rectified voltages is input to a Balance circuit which produces the difference between the two rectified voltages. If the rectified voltages are equal the balance circuit has a zero difference. This difference is amplified by an Amplifier and input to a Precision Full Wave Rectifier. The Precision Full Wave Rectifier produces a dc voltage difference which is representative of the magnitude of the difference between the voltage of the generator and the bus to which the generator is to be connected.

The Bus Rectifier, Gen Rectifier, Balance Circuit and Precision Full Wave Rectifier thus senses the magnitude of the difference between the voltage output of the generator and the voltage of the bus to which the generator is to be connected.

The Maximum Level Limit is connected to the output of the Precision Full Wave Rectifier and produces a voltage having a magnitude is representative of the magnitude of this difference when the magnitude of the difference is less than a first predetermined value, and having a magnitude which is maintained at a predetermined maximum level when the magnitude of the difference is greater than the first predetermined value.

Magnitude of current output from a Constant Current Generator is adjusted by a Correction Pulse Width Adjustment control which is calibrated according to the maximum pulse width of the control signals i.e., Raise/Lower Voltage Relay Signals. The adjustment may be for example over the range of 0.1 second to 5 seconds of duration. The constant magnitude current charges a capacitor in a Capacitor Circuit and thus a constant rate of voltage change dv/dt is achieved (i/C=dv/dt). The capacitor voltage is input to a Comparator which compares the capacitor voltage with the output of the Maximum Level Limit. The Comparator outputs a pulse having a width or duration which is a function of the voltage difference as produced by the Max Level Limit circuit and the time required to charge the capacitor to the voltage difference.

A 0.1 Second Wide Pulse Generator produces a pulse having a fixed pulse width or duration which is for example one-tenth of a second. This fixed width pulse is initiated by a Trigger at the same time that the capacitor in the capacitor circuit begins charging. The Comparator output pulse and the 0.1 second wide pulse are input to a Gate which generates an output pulse having a duration which is the longer of the Comparator output pulse or the 0.1 second wide pulse.

The Gate output is connected to an Interval Pulser which periodically initiates the production of one of the control pulses. The Interval Pulser is an example of timing means for initiating each of the control pulses at predetermined time intervals. This interval is adjusted by a Correction Pulse Interval Adjustment which for example permits adjustment of the period over the range 0.2 second to 10 seconds. The Interval Pulser will periodically output a control pulse having a width as determined by the Gate. A Test Point is provided to monitor the output of the Interval Pulser during testing and calibration.

The initiation of the control pulse by the Interval Pulser will cause the 0.1 Second Wide Pulse Generator to start the generation of the 0.1 second pulse (the Trigger). Also at the initiation, the capacitor in the Capacitor Circuit which was being held in a discharged condition by a discharge path, has the discharge path disconnected to permit the capacitor to begin charging and increase its voltage at the constant rate described above. The Capacitor Circuit is thus an example of means responsive to the initiating means (e.g., Interval Pulser) for storing the current to produce a voltage which increases at a constant rate.

The capacitor will continue to charge until the Comparator senses that the capacitor voltage is greater than the voltage difference sensed at the output of the Max Level Limit circuit. If the magnitude of the difference exceeds the first predetermined value, the Max Level Limit circuit will output the predetermined maximum level and control pulses will be generated having a fixed maximum pulse duration. The Gate terminates the output pulse at the later of the having a duration which is the longer of the Comparator output pulse termination or the 0.1 second wide pulse termination. At the termination, the discharge path will be connected across the capacitor and the output of the Interval Pulser will signal the end of the control pulse by a logic transition. The control pulses decrease in duration with a decreasing magnitude of difference when this magnitude is below this first predetermined value down to a fixed minimum pulse duration at a second and lesser predetermined value of the magnitude of difference. Below this second predetermined value, pulses of a minimum pulse duration (e.g., 0.1 sec.) are generated for magnitudes less than the second predetermined value, whereby the control pulses produce the raise or lower control signals for the voltage regulator to cause the voltage output of the generator to approach the voltage of the bus.

The 0.1 Sec. Wide Pulse Generator thus senses or identifies the end of 0.1 sec. time interval and is an example of means for sensing the end of a predetermined time period starting when the control pulse is initiated, the predetermined time period corresponding to the minimum pulse duration.

The Comparator circuit is an example of means for comparing the magnitude of the voltage produced on the capacitor with the voltage output from the Max Level Limit circuit to terminate the control pulse when the magnitude of the produced voltage attains the voltage output whereby when the latter is at its predetermined maximum level and the magnitude of the difference is greater than the first predetermined value control pulses of the fixed maximum pulse duration are maintained but if the magnitude of the difference is less than the first predetermined value and greater than a second predetermined value, the control pulses decrease in duration with a decreasing magnitude of difference.

The Gate circuit is an example of means responsive to a comparing means (e.g., Comparator) and a sensing means (e.g., 0.1 Sec. Wide Pulse Generator) for terminating the control pulses when the magnitude of the produced voltage (e.g., capacitor voltage) attains a magnitude of the difference sensed (e.g., Max Level Limit output) or at the end of the predetermined time period (e.g., 0.1 sec.), whichever occurs later, thereby to generate control pulses of the minimum pulse duration for magnitudes of the difference less than the second predetermined value.

Both a Raise Output Gate and Lower Output Gate receive the control pulses from the Interval Pulser. The Raise and Lower Output Gates also receive a Voltage Inhibit generated by the Voltage Acceptance Circuit 11 (as will be discussed with respect to the Voltage Acceptance Circuit of FIG. 3). The Voltage Inhibit will terminate or end output control signals from the Raise or Lower Output Gates. The Raise and Lower Output are thus examples of means responsive to an inhibit signal for terminating the control signals. A Remove Correction signal is generated by the Phase, Frequency and Gating Circuits of the Synchronizer in FIG. 1. The Remove Correction is generated when the breaker 52 is about to close i.e., correction of the generator voltage is no longer needed and as will be easily appreciated by the skilled worker may be activated using the Close Contact Signal as shown in FIG. 1. Depending on whether a Raise or Lower Voltage is required (as will be discussed with respect to the Voltage Acceptance Circuit of FIG. 3), the corresponding Raise or Lower Output Gate is enabled to permit either a Raise Voltage Relay Signal or a Lower Voltage Relay Signal to be output to the Voltage Regulator. When the Raise Voltage Relay Signal or Lower Voltage Relay Signal is output, a corresponding Raise or Lower indicator is lit. The control pulses thus produce these Relay Signals or control signals for the Voltage Regulator to cause the voltage output by the generator to approach the voltage at the bus.

The Interval Pulser, Gate, 0.1 Sec. Wide Pulse Generator, Constant Current Generator, Capacitor Circuit, Max Level Limit and Comparator thus constitute an example of means responsive to the magnitude sensed (e.g., sensed by the Bus Rectifier, Gen Rectifier, Balance Circuit and Precision Full Wave Rectifier) for generating control pulses, each control pulse having a pulse duration which is function of the magnitude of the sensed difference and each control pulse having the fixed maximum pulse duration when the magnitude of the difference is greater than the first predetermined value, wherein each control pulse has a pulse duration which decreases with a decreasing magnitude of difference down to the fixed minimum pulse duration at the second and lesser predetermined magnitude of difference when the magnitude of the sensed difference is less than the first predetermined value, and wherein each control pulse has the minimum pulse duration when the magnitude of the difference is less than the second predetermined value, whereby the control pulses produce the raise or lower control signals for the voltage regulator to cause the voltage output of the generator to approach the voltage of the bus.

Figure 3:
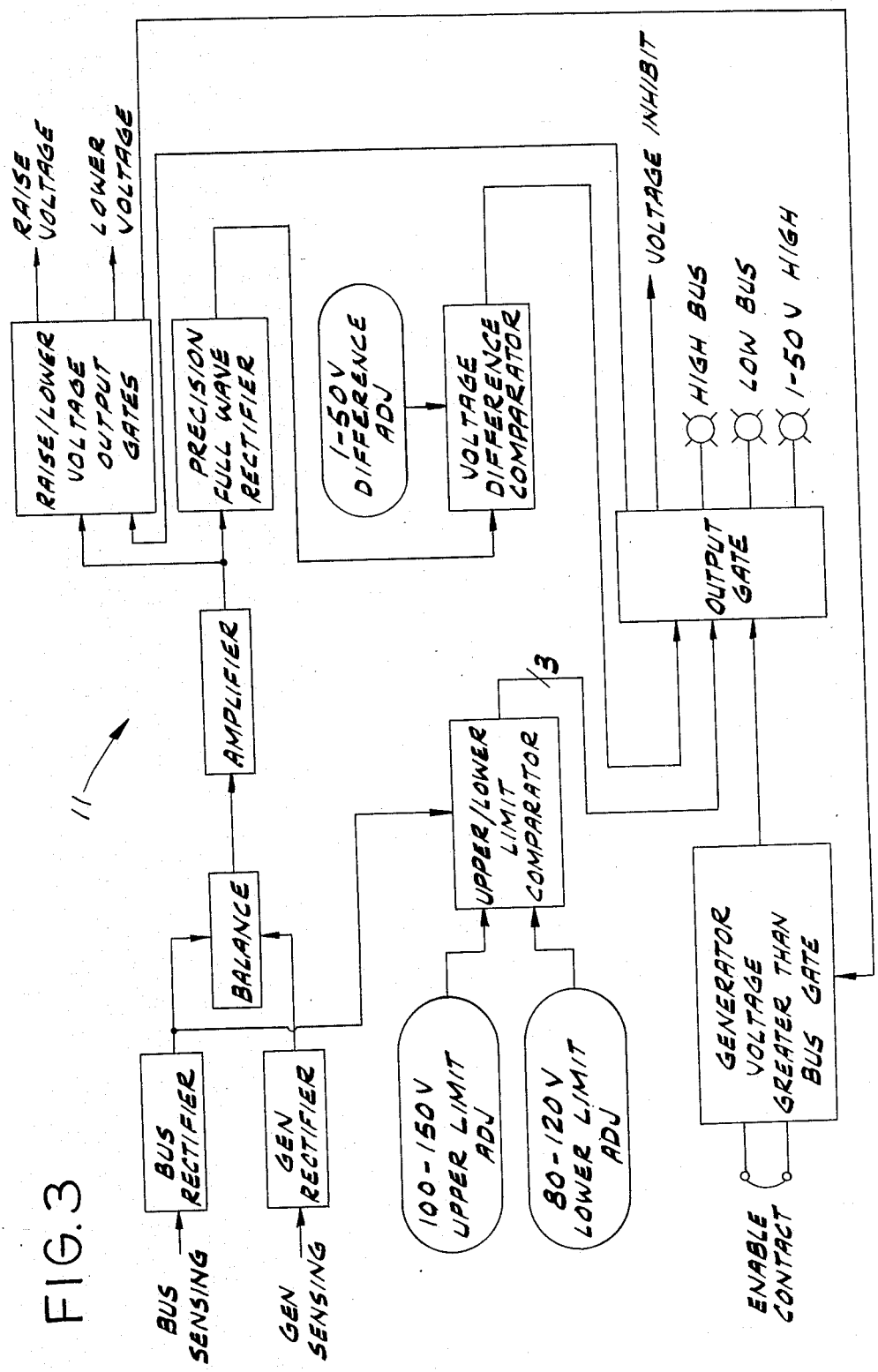
FIG. 3 is a block diagram representation of a Voltage Acceptance Circuit included in FIG. 1.

Referring to FIG. 3, a block diagram of the Voltage Acceptance Circuit 11 includes a Bus Rectifier and generator rectifier circuit each of which rectifies the corresponding voltages from the Bus and Gen Sensing. The rectified bus voltage is a positive dc signal and the rectified generator voltage is a negative dc signal. Each of the rectified voltages is input to a Balance circuit which produces a difference between the two voltages i.e., a positive voltage if the bus voltage is greater than the generator voltage and a negative voltage if the generator voltage is greater than the bus voltage. If the rectified voltages are equal the Balance circuit has a zero difference. This difference is amplified by an Amplifier, the output of the Amplifier is used by Raise/Lower Voltage Output Gates which produce a digital Raise or Lower Voltage signal depending upon whether the Amplifier output is a positive or negative voltage. The Raise/Lower Voltage Output Gates are thus an example of means for sensing whether the voltage output of the generator is lower or higher than the voltage of the bus. This Raise or Lower Voltage signal enables the corresponding Raise or Lower Output Gate shown in FIG. 2. The Raise and Lower Output Gates are responsive to the control pulses and the Raise/Lower Voltage Output Gates of FIG. 3 (e.g., digital Raise or Lower Voltage Signal) for producing raise or lower control signals for the Voltage Regulator to cause the generator voltage to approach the bus voltage. The Raise/Lower Voltage Output Gates also produce a signal for a Generator Voltage Greater Than Bus Gate indicating whether the generator voltage is greater than the bus voltage.

The output of the Amplifier is also input to a Precision Full Wave Rectifier. The Full Wave Rectifier produces a dc voltage difference which has a magnitude equal to the magnitude of the difference between the voltage of the generator and the bus to which the generator is to be connected. A Voltage Difference Comparator senses whether or not the magnitude of the difference is greater than an adjustable value (e.g., 1–50 volts). The Voltage Difference Comparator produces an output to an Output Gate which drives an 1–50 Volt High indicator when appropriate. As will be readily appreciated by the skilled worker, a comparator circuit may be used to compare the magnitude of the difference to an adjustable percentage of the bus voltage according to the formula: Absolute value of [BUS voltage—GEN voltage] is less than or equal to an adjustable percentage×BUS voltage. The use of the adjustable percentage requires that the bus voltage be used by the comparator circuit (i.e., the output of the bus rectifier is input to the comparator circuit). For example, the percentage may be adjustable over a range of 0.5% to 5.0%.

The output of the Bus Rectifier is also connected to an Upper/Lower Limit Comparator. The Bus Rectifier output voltage is compared with both an adjustable upper limit (e.g., 100–150 volts) and an adjustable lower limit (e.g., 80–120 volts). Three output signals are produced by the Upper/Lower Limit Comparator (high; low; and high or low) and input to the Output Gate. The Output Gate uses these signals to produce an indication of High Bus or of Low Bus.

The Generator Voltage Greater Than Bus Gate when enabled by an Enable Contact produces a signal indicative of whether the generator voltage is greater than bus voltage (i.e., a lower voltage condition signal from the raise/lower voltage output gates). The Output Gate receives the signal produced by the Generator Voltage Greater Than Bus Gate.

The Output Gate will produce the Voltage Inhibit signal when either the Upper/Lower Limit Comparator produces the high or low signal, the Voltage Difference Comparator produces the 1–50 volt high signal or the Generator Voltage Greater Than Bus Gate, when enabled by the enable contact, produces the signal indicative of whether the generator voltage is greater than bus voltage. The Output Gate and Upper/Lower Limit Comparator are an example of means for generating an inhibit signal when the voltage of the is above a predetermined high limit or below a predetermined low limit. The Output Gate and Voltage Difference Comparator are an example of means for generating an inhibit signal when the magnitude of the difference is above a predetermined maximum.

The Output Gate also provides a signal to the Raise/Lower Voltage Output Gates when the high or low bus condition is detected. This signal causes the Raise Voltage and Lower Voltage signals to remain inactive or low and thus the Voltage Matching Circuit 21 will not permit control signals to be output to the Voltage Regulator.

Figure 4A:
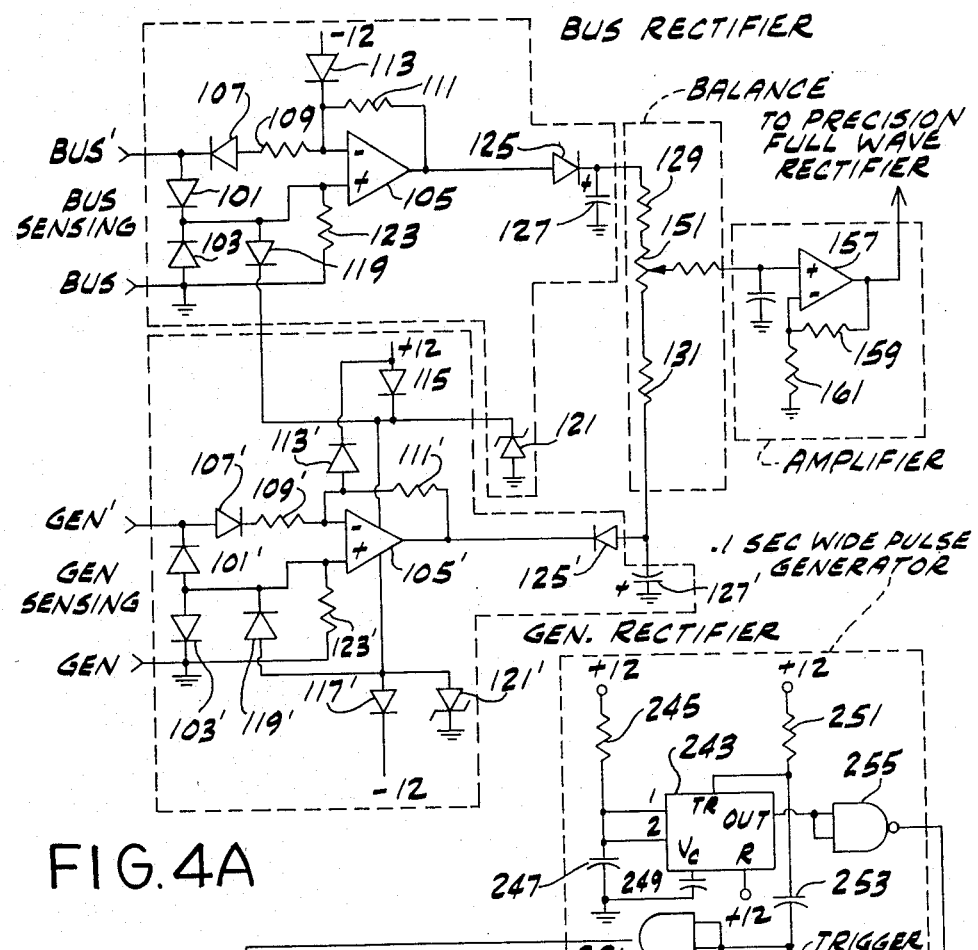
FIGS. 4A and 4B are a schematic of the Voltage Matching Circuit in FIG. 2.
Figure 4A:
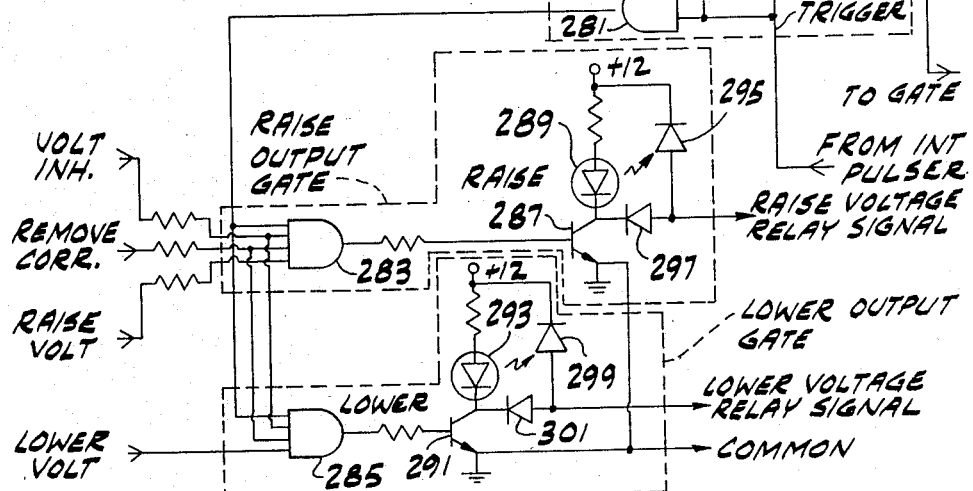
Figure 4B:
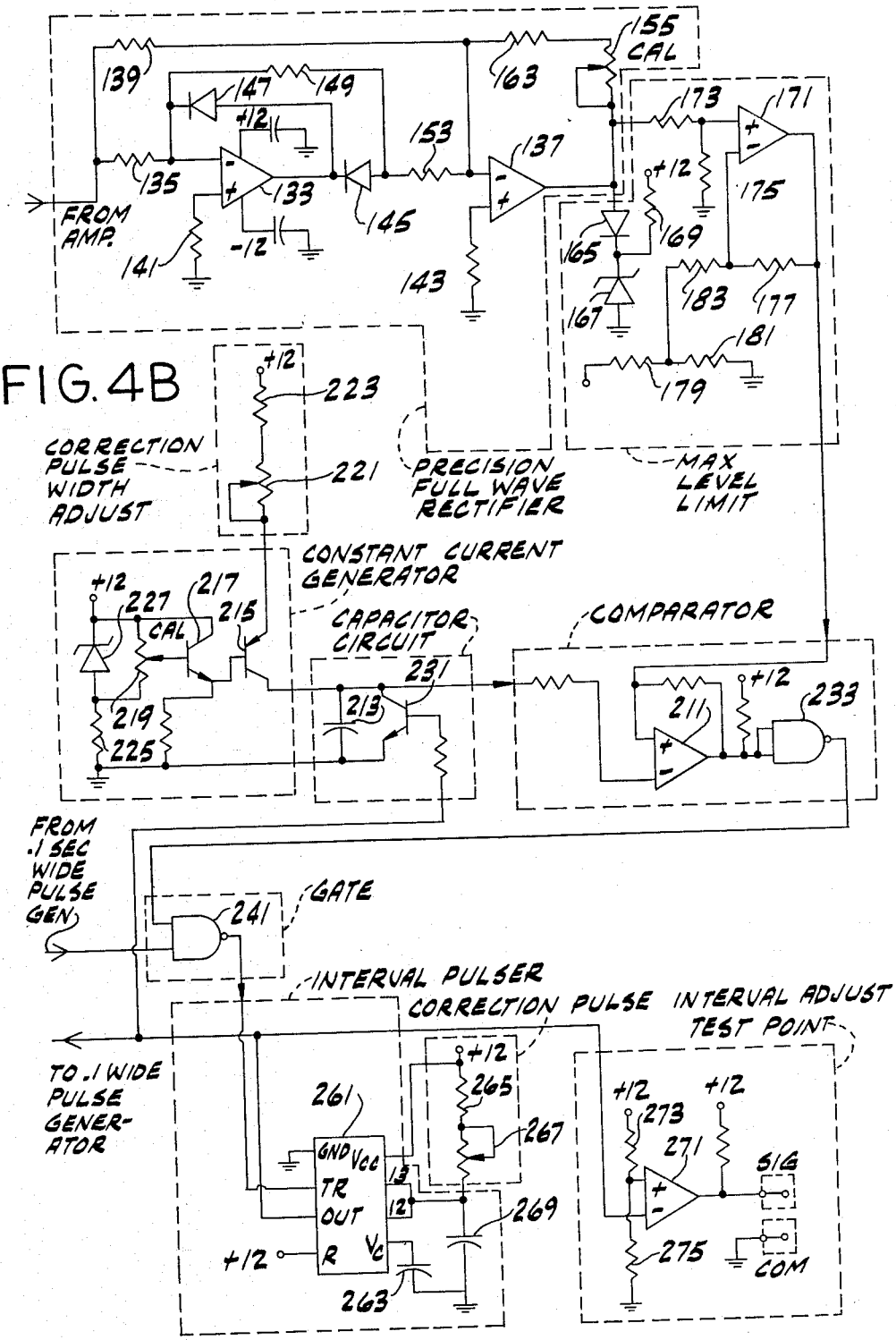

FIGS. 4A and 4B and 5A and 5B show detailed electronic circuits for the above described Voltage Matching Circuit 21 and Voltage Acceptance Circuit 11, respectively. In FIG. 4A each of the Bus and Gen Rectifiers includes rectifying diodes, 101 and 103 and 101' and 103' respectively, series connected across Bus Sensing BUS' and BUS & GEN' and GEN respectively. Diodes 101 and 103 have a common cathode connected to a positive input on an amplifier 105 and diodes 101' and 103' have a common anode connected to a positive input on an amplifier 105'. BUS' is connected to the cathode side of a diode 107 which has its anode connected to the negative input of amplifier 105 through a resistor 109. Similarly, GEN' is connected to the anode side of a diode 107' which has its cathode connected to the negative input of amplifier 105' through a resistor 109'. A feed back resistor 111 is connected between the output and the negative input of amplifier 105 and a feed back resistor 111' is connected between the output and the negative input of amplifier 105'. A diode 113 has its anode connected to the −12 volt supply and its cathode connected to the negative input of amplifier 105. Similarly, a diode 113' has its cathode connected to the +12 volt supply and its anode connected to the negative input of amplifier 105'.

Power is supplied to both amplifiers 105 and 105' from the +12 volt supply through a diode 115 and from the −12 volt supply through a diode 117. The cathode of diode 115 is connected to the cathode of a diode 119 which has its anode connected to the positive input of amplifier 105 and is connected to the cathode of a zener diode 121 which has its anode connected to common. Analogously, the anode of diode 117 is connected to the anode of a diode 119' which has its cathode connected to the positive input of amplifier 105' and is connected to the anode of a zener diode 121' which has its cathode connected to common. A resistor 123 is connected between the positive input of amplifier 105 and common and a resistor 123' is connected between the positive input of amplifier 105' and common. An output diode 125 has its anode connected to the output of amplifier 105 and its cathode connected to a filter capacitor 127. Similarly, an output diode 125' has its cathode connected to the output of amplifier 105' and its anode connected to a filter capacitor 127'. Diodes 113, 115, 117, 119, 121 and 121' are used to clamp the Bus-Bus' and Gen-Gen' voltages to be within the plus and minus 12 volts to protect amplifiers 105 and 105'. The output of the Bus Rectifier is a positive dc signal proportional to the bus voltage and the output of the Gen Rectifier is a negative dc signal proportional to the generator voltage.

These positive and negative dc signals are connected to the Balance circuit which includes a potentiometer 151 having the internal resistor connected to the outputs of the Bus and Gen Rectifiers through resistor 129 and 131 respectively. When calibrated a wiper of the potentiometer 151 is adjusted so that there are zero volts when the generator and bus voltages are equal. The wiper of the potentiometer 151 is connected to the positive input of an operational amplifier 157 connected to external resistors 159 and 161 to have a gain of approximately 8.5.

The output of amplifier 157 is connected to a negative input of an amplifier 133 through a resistor 135 and is connected to a negative input of an amplifier 137 through a resistor 139. Positive inputs of amplifier 133 and 137 are connected to common by resistors 141 and 143 respectively. The output of amplifier 133 is connected to the cathode of a diode 145 and the anode of a diode 147. The anode of diode 145 is connected through a feed back resistor 149 to the cathode of diode 147 which is connected to the negative input of amplifier 133. The anode of diode 145 is connected to the negative input of amplifier 137 through resistor 153. A variable feed back resistor 155 and a fixed feed back resistor 163 are series connected between the output and the negative input of amplifier 137.

When the output of amplifier 157 is negative, the output of amplifier 133 is clamped at 0.7 volts by diode 147. Diode 145 is back biased and disconnects the output of amplifier 133 from the negative input of amplifier 137. The amplifier 137 then inverts its input and produces positive voltage at its output equal in magnitude to the negative input. When the output of amplifier 157 is positive, the output of amplifier 133 i.e., a common connection of resistors 149 and 153 is negative. The amplifier 137 then acts as a summing point amplifier which output is calculated according to the formula: Eout=−Ein (R163+R155/R139)+Ein (R163+R155/R153) where Eout is the output voltage of amplifier 137, Ein is the input voltage, and R163, R155, R139 and R153 are the resistances of the corresponding resistors. The values of resistors 163, 155, 139 and 153 are chosen so that Eout=+Ein. For example, resistor 163 is 7.5 kohms, resistor 139 is 10 kohms, and resistor 153 is approximately 5 kohms. The resistor 155 is adjusted to calibrate so that a unity gain is achieved i.e. resistor 155 is approximately 2.5 kohms. The output of amplifier 137 is again a positive voltage equal in magnitude to the positive input voltage. The output of the amplifier 137 is thus representative of the magnitude of the difference between the voltage of the bus and the voltage of the generator.

The output of amplifier 137 is connected to the anode of a diode 165 which has its cathode connected to the cathode of a 3.6 volt zener diode 167. The anode of diode 167 is connected to common and its cathode is also connected to the +12 volt supply through resistor 169. If the magnitude of the voltage difference is greater than a predetermined magnitude of difference, this output is limited to a maximum level or value by the series connected zener diode 167 and diode 165 (i.e., 3.6 volts plus approximately 0.7 volts drop on diode 165). This maximum level e.g., 4.3 volts corresponds to a first predetermined value of the magnitude of the difference e.g., 20 volts.

The output of amplifier 137 is connected to a positive input of an amplifier 171 through a resistor 173. The positive input of amplifier 171 is also connected through resistor 175 to common. A feed back resistor 177 is connected between the output and the negative input of amplifier 171. A voltage divider includes resistors 179 and 181 connected between the −12 volt supply and common. The divided voltage is connected through a resistor 183 to the negative input of amplifier 171. The resistors 173, 175, 177, 179, 181 and 183 are chosen so that when the voltage difference is very small i.e., near zero volts, the output of amplifier 171 produces a small offset voltage to maintain operation of the circuitry for small values of the magnitude of the voltage difference.

This output of the amplifier 171 is connected to a positive input of an comparator 211 included in the Comparator. The negative input of comparator 211 is connected to a 10 microfarad capacitor 213 included in the capacitor circuit. Capacitor 213 is charged by the constant current generator which includes a PNP transistor 215 with its collector connected to the capacitor 213. Transistor 215 has its base connected to a calibrating network which includes a connection to an emitter of an NPN transistor 217 for temperature compensation. The base of transistor 217 has an adjustable bias voltage provided by an adjustable potentiometer 219 which is connected between +12 volts and a resistor 225 which is connected to common. A zener diode 227 has its anode connected to the resistor 225 and its cathode connected to the +12 volt supply.

The constant current generator provides a constant magnitude current through the collector of transistor 215. The emitter of transistor 215 is connected to an adjustable resistor 221, a resistor 223 and the +12 volt supply. Adjustable resistor 221 is used to vary the magnitude of the current supplied to capacitor 213. Thus depending on the value of the current and the capacitance of capacitor 213, the change in voltage on capacitor will be a constant (i/c=dv/dt).

The Constant Current Generator is calibrated by first setting the resistor 221 to the desired maximum pulse width e.g., 2 seconds. A known magnitude of voltage difference is applied to the Bus and Gen sensing inputs. The potentiometer 219 is then adjusted until the desired length control pulses are obtained at the Test Point.

An NPN transistor 231, included in the capacitor circuit, has its collector and emitter connected to respective terminals of capacitor 213. When the base of transistor 231 (connected to the output of the Interval Pulser) is at a logic high, the collector—emitter voltage will be at a logic low (approx. 0.2 v). The voltage on capacitor 213 will thus remain at 0.2 volts. When the base of transistor 231 is at a logic low, the collector—emitter will be effectively an open circuit and capacitor 213 will increase in voltage according to the current magnitude supplied from transistor 215.

The output of comparator 211 is at a logic high as long as the full wave recitifier output is greater than the voltage on capacitor 213. A NAND gate 233 included in the Comparator inverts this logic high and a logic low is output from the Comparator. When the voltage on capacitor 213 exceeds the output of the full wave rectifier, the Comparator output will go to a logic high.

The Comparator output is connected to one input of a NAND gate 241 included in the Gate. A second input of NAND gate 241 is connected to the 0.1 Second Wide Pulse Generator. The 0.1 Second Wide Pulse Generator includes a timer circuit 243 of the type SE556CN. Circuit 243 has pins 1 and 2 connected to one terminal of a 270 kilohm resistor 245 which has its other terminal connected to the +12 volt supply. Pins 1 and 2 of circuit 243 are also connected to a 0.33 microfarad capacitor 247 which is also connected to common. A Vc pin of circuit 243 is connected to one terminal of a 0.01 microfarad capacitor 249 which has its other terminal connected to common. A reset pin R of circuit 243 is connected to the +12 volt supply. A trigger pin TR of the circuit 243 is connected to the +12 volt supply through resistor 251. Pin TR is also connected through a 0.001 microfarad capacitor 253 to the output of the Interval Pulser. When the output of the Interval Pulser is at a logic high, the TR pin will also be at a logic high and output pin OUT will be at a logic low. A NAND gate 255 is connected to invert the output pin OUT and provide this inverted signal to the Gate. When the output of the Interval Pulser goes from a logic high to a logic low (near common) the OUT pin will go to a logic high and thus the Gate will receive a logic low from gate 255. The logic low output of gate 255 will remain for approximately 0.1 second at which time the output of gate 255 will go to a logic high.

Gate 241 thus receives one input from gate 233 and another input from gate 255. The output of gate 241 will be a logic high when either the output of gate 233 or gate 255 is at a logic low and will be a logic low only when both gates 233 and 255 are at a logic high. Thus, the output of gate 241 will not make a logic high to logic low transition until both gates 233 and 255 are outputting a logic high.

The output of gate 241 is connected to the Interval Pulser which includes a timer circuit 261 of the type SE556CN. Circuit 261 is powered at pin Vcc from the +12 volt source and the reset pin R is also connected to the +12 volt source. A 0.01 microfarad capacitor 263 is connected to pin Vc of circuit 261 and to common. A 17.8 kohm resistor 265, a 1 megaohm variable resistor 267 and a 10 microfarad capacitor 269 are series connected between the +12 volt source and common. Pins 12 and 13 of circuit 261 are connected to the capacitor 269. Variable resistor 265 provides the Correction Pulse Interval adjustment. Circuit 261 also has an OUT pin which provides a signal at predetermined time intervals, the interval of which is adjusted by variable resistor 267. For example, the interval may be adjusted between one-tenth second and five seconds using these values for the related components. The Interval Pulser will thus periodically have a logic low on the OUT pin of circuit 261, the period being as adjusted by variable resistor 267. The OUT pin of circuit 261 will remain at the logic low until the output of gate 241 produces a logic low at which time the OUT pin will go to a logic high.

The Test Point circuit is connected to the OUT pin of circuit 261. The OUT pin drives the negative input of a differential amplifier 271. The positive input of the amplifier 271 is connected to a voltage divider network which includes series connected resistors 273 and 275 having equal resistance. A signal SIG terminal is driven by the output of amplifier 271. The SIG terminal and a common COM terminal may be used to monitor the OUT pin of circuit 261 for testing or the like.

The OUT pin of circuit 261 is also connected to the Capacitor Circuit. The base of the NPN transistor 231 is driven by the OUT pin so that, as also described above, when the base of transistor 231 is at a logic high, the collector—emitter voltage will be at a logic low and provide a discharge path for the capacitor 213, thus maintaining the voltage on capacitor 213 at approximately 0.2 volt. When the base of transistor 231 is at a logic low, the collector—emitter will be effectively an open circuit i.e., the discharge path is disconnected, and capacitor 213 will increase in voltage according to the current magnitude supplied from the Constant Current Generator. The transistor 231 is thus an example of switch means responsive to an initiating means (e.g., Interval Pulser) for disconnecting the capacitor 213 from the discharge path.

Also connected to the OUT pin of circuit 261 is one terminal of the capacitor 253. When the OUT pin of circuit 261 is at a logic high, the TR pin of circuit 243 will also be at a logic high. When the OUT pin of circuit 261 goes from a logic high to a logic low (near common) the TR pin of circuit 243 will briefly go to a logic low. Capacitor 253 will charge from the +12 volt supply through resistor 251 and will result in the TR pin of circuit 243 returning to a logic high.

Figure 5A:
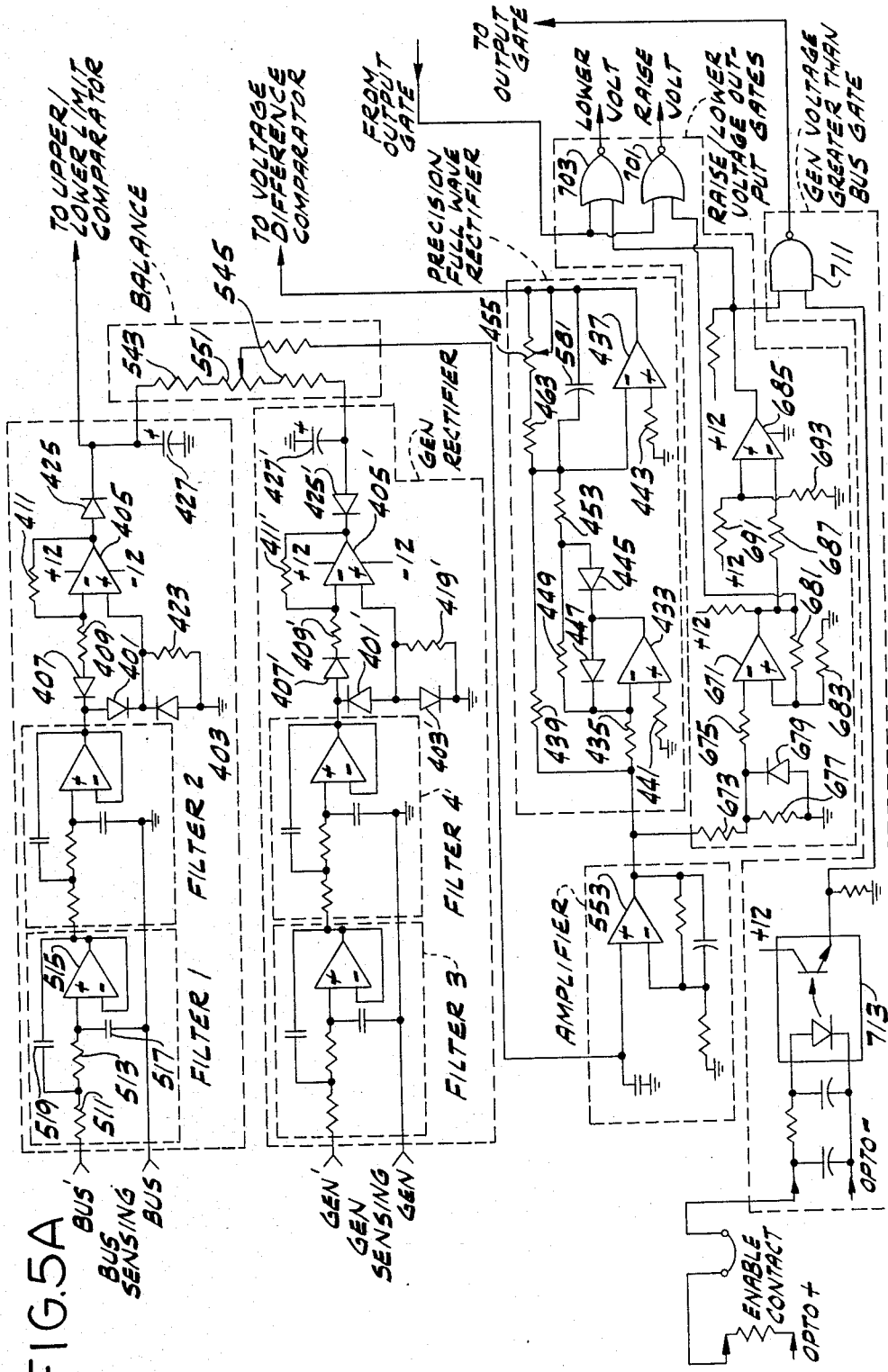
FIGS. 5A and 5B are a schematic of the Voltage Acceptance Circuit in FIG. 3.
Figure 5B:
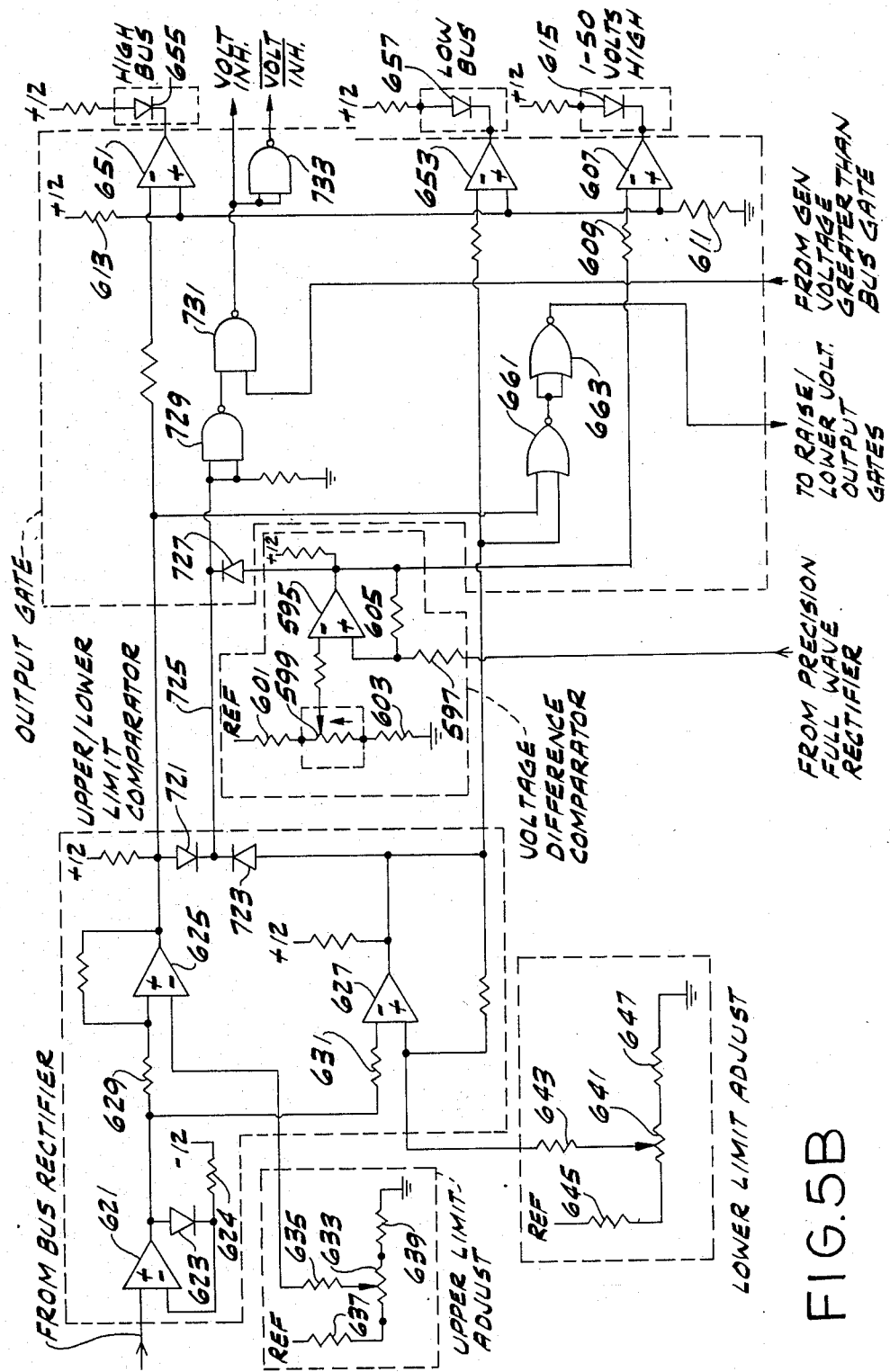

The OUT pin of circuit 261 is also connected to a an inverting gate 281 which output is connected to one input of a four input AND gate 283 included in the Raise Output Gate and one input of a our input AND gate 285 included in the Lower Output Gate. A second input of gates 283 and 285 is connected to the Voltage Inhibit from the Output Gate of the voltage matching circuit (FIGS. 3, 5A and 5B). A third input of the gate 283 is connected to the Raise Voltage output of the Raise/Lower Voltage Output Gates and similarly a third input of the gate 285 is connected to the Lower Voltage output of the Raise/Lower Voltage Output Gates (FIGS. 3, 5A and 5B). The fourth input of both gates 283 and 285 is connected to receive the Remove Correction signal as discussed with respect to FIG. 2.

When any of the four inputs to either gate 283 or gate 285 is low, each gate will have a corresponding logic low output. The logic low output of gate 283 will maintain an NPN driver transistor 287 in an off or non-conducting state and a Raise light emitting diode LED 289 will be off. A diode 295 is connected with its anode to the Raise Voltage Relay Signal and its cathode to the +12 volt supply. A diode 297 has its anode connected to the Raise Voltage Relay Signal and its cathode connected to the collector of transistor 287. The Raise Voltage Relay Signal will thus be "open" i.e. resemble an open contact between the Raise Voltage Relay Signal and Common.

Similarly, the logic low output of gate 285 will maintain an NPN driver transistor 291 in an off or non-conducting state and a Lower LED 293 will be off. A diode 299 is connected with its anode to the Lower Voltage Relay Signal and its cathode to the +12 volt supply. A diode 301 has its anode connected to the Lower Voltage Relay Signal and its cathode connected to the collector of transistor 291. The Lower Voltage Relay Signal will thus be "open" i.e. resemble an open contact between the Lower Voltage Relay Signal and Common.

When all four inputs to gate 283 are at a logic high, gate 283 will have a logic high output and the driver transistor 287 will go to a conducting state and the LED 289 will turn on. Additionally, the Raise Voltage Relay Signal will go to a "close" i.e. resemble a closed contact since there is a conducting path through diode 297 and the collector of transistor 287 to common.

Similarly, when all four inputs to gate 285 are at a logic high, gate 285 will have a logic high output and the driver transistor 291 will go to a conducting state and the Lower LED 293 will turn on. Additionally, the Lower Voltage Relay Signal will go to a "close" i.e. resemble a closed contact since there is a conducting path through diode 301 and the collector of transistor 291 to common.

The Voltage Acceptance Circuit 11 shown in FIGS. 3, 5A and 5B will now be described. In FIG. 5A each of the Bus and Gen Rectifiers include two identical filters (Filter1 and Filter2 for the Bus Rectifier and Filter3 and Filter4 for the Gen Rectifier). For brevity the Filter1 will discussed in detail but as will be appreciated the discussion applies to the other three. Bus' is connected through series connected resistors 511 and 513 to a positive input of amplifier 515. The positive input of amplifier 515 is also connected to one terminal of a capacitor 517 and the other terminal of capacitor 517 is connected to common and to Bus. The output of amplifier 515 is connected through a capacitor 519 to a common point between resistors 511 and 513. Filter1 and Filter2 are series connected and form a low pass filter of 12 db per octave that removes harmonic distortion of the sensed bus voltage. Similarly, Filter3 and Filter4 are series connected to remove harmonic distortion of the sensed generator voltage.

The output of Filter2 is connected to a full wave rectifier comparable to the Bus Rectifier shown in FIG. 4A and the output of Filter4 is connected to a full wave rectifier comparable to the Gen Rectifier shown in FIG. 4A. For convenience and brevity, corresponding elements are labelled with numerals starting with the 400's instead of the 100's of FIG. 4A and the detailed discussion will not be repeated here.

The output of the Bus Rectifier of FIG. 5A (output of an amplifier 405) is thus a positive dc signal proportional to the magnitude of the bus voltage and the output of the Gen Rectifier of FIG. 5A (output of an amplifier 405') is a negative dc signal proportional to the magnitude of the generator voltage.

These positive and negative dc signals are connected to the Balance which includes a potentiometer 551 having the internal resistor connected through resistors 543 and 545 to the outputs of the Bus and Gen rectifier, respectively. When calibrated a wiper of the potentiometer 551 is adjusted so that there are zero volts when the Gen and Bus voltages are equal. The wiper of the potentiometer 551 is connected to the positive input of the Amplifier which includes an operational amplifier 553 arranged with resistors and capacitors to produce a gain of approximately 6. The output of the amplifier 553 is thus a voltage which value is proportional to the difference between the bus voltage and the generator voltage, which is positive if the bus voltage is greater than the generator voltage and which is negative if the generator voltage is greater than the bus voltage.

The Amplifier output is connected to the Precision Full Wave Rectifier. The Precision Full Wave Rectifier of FIG. 5A is comparable to the Precision Full Wave Rectifier shown in FIG. 4B. For convenience and brevity, corresponding elements are labelled with numerals starting with the 400's instead of the 100's of FIG. 4B and the detailed discussion will not be repeated here. It will however be noted that the output of an amplifier 437 is also connected through a capacitor 581 to its negative input to reduce noise at the output. The output of the amplifier 437 is proportional to the magnitude of the difference between the voltage of the bus and the voltage of the generator.

The output of amplifier 437 is connected to the Voltage Difference Comparator which includes a differential amplifier 595. The positive input of the amplifier 595 is connected through resistor 597 to the output of amplifier 437 and the negative input is connected to a wiper of the a potentiometer 599. The potentiometer 599 is series connected to voltage divider resistors 601 and 603 which are connected to a reference voltage REF and common respectively. The reference voltage REF may be generated using the +12 volt supply and other circuitry to produce an accurate reference. A resistor 605 is connected between the output of the amplifier 595 and the positive input. The output of amplifier is thus indicative of whether the magnitude of the voltage difference between the bus and the generator is greater or less than a predetermined voltage difference as determined by the setting of the potentiometer 599. For example, the potentiometer 599 is shown to be adjustable for a voltage difference in the range of 1–50 volts.

The output of amplifier 595 is connected to the negative input of an amplifier 607 through a resistor 609. The positive input of amplifier 607 is connected to the common terminal of a voltage divider network which includes series connected resistors 611 and 613 of equal value. The output of amplifier 607 is connected to a 1–50 Volts High LED 615 which will be on when the magnitude of the voltage difference is greater than the value as set by the potentiometer 599.

Also connected to the positive dc signal output of the Bus Rectifier is the Upper/Lower Limit Comparator. The positive dc signal output is connected to the positive input of a buffering amplifier 621 which has a temperature compensating diode 623 connected between its output and its negative input. The negative input of amplifier 621 is also connected to the −12 volt supply through a resistor 624. The output of the amplifier 621 is connected to the positive input of a differential amplifier 625 and the negative input of a second differential amplifier 627 through resistors 629 and 631, respectively.

The negative input of the amplifier 625 is connected to a wiper on a potentiometer 633 through a resistor 635. Adjustment of the wiper is used for varying the voltage input to the amplifier 625 from a series connected voltage divider network which includes a reference voltage REF, resistor 637, the potentiometer 633 and resistor 639. The wiper of the potentiometer 633 is adjusted to establish the upper limit of the bus voltage. For example, this upper limit may be adjustable over the range 100 to 150 volts. The amplifier 625 thus has its output at a logic high if the upper limit is exceeded and its output at a logic low if the upper limit is not exceeded.

Similarly, the positive input of the amplifier 627 is connected to a wiper on a potentiometer 641 through a resistor 643. Adjustment of the wiper is used for varying the voltage input to the amplifier 627 from a series connected voltage divider network which includes a reference voltage REF, resistor 645, the potentiometer 641 and resistor 647. The wiper of the potentiometer 641 is adjusted to establish the lower limit of the bus voltage. For example, this lower limit may be adjustable over the range 80 to 120 volts. The amplifier 627 thus has its output at a logic high if the bus voltage is below this lower limit and its output at a logic low if the bus voltage is above this lower limit.

The output of amplifier 625 is connected to the negative input of an amplifier 651. The output of amplifier 627 is connected to the negative input of an amplifier 653. The positive inputs of amplifier 651 and amplifier 653 are connected to the common terminal of the voltage divider network which includes resistors 611 and 613. The output of amplifier 651 is connected to a High Bus LED 655 which will be on when the magnitude of the bus voltage is greater than the upper limit as set by the potentiometer 633. Similarly, the output of amplifier 653 is connected to a Low Bus LED 657 which will be on when the magnitude of the bus voltage is less than the lower limit as set by the potentiometer 641.

The output of amplifier 625 (Upper Limit) and the output of amplifier 627 (Lower Limit) are connected to inputs of a NOR gate 661. The output of the gate 661 is inverted by a NOR gate 663 (both its inputs are connected to the output of gate 661). The output of gate 663 will be at a logic high if either the bus voltage is above the upper limit or below the lower limit.

The generation of the Raise Voltage and Lower Voltage signals will now be described. The output of amplifier 553 is connected to the negative input of a comparator 671 through resistor 673 and resistor 675. One terminal of a resistor 677 and the anode of a diode 679 are connected to common and the other terminal of resistor 677 and the cathode of diode 679 are connected to the common terminal of resistors 673 and 675. Resistor 681, connected between the output and the positive input of comparator 671, and resistor 683, connected between the positive input of comparator 671 and common, are chosen to produce approximately unity gain for the comparator 671. When the output of amplifier 553 is a positive voltage, the output of comparator 671 will be a logic low, indicating a need to raise the voltage of the generator. When the output of amplifier 553 is a negative voltage, the output of comparator 671 will be a logic high, indicating a need to lower the voltage of the generator.

The output of comparator 671 is connected to the negative input of amplifier 685 through resistor 687. The positive input of amplifier 685 is connected to a voltage divider which includes series connected resistor 691 and resistor 693 which are connected between +12 volts and common. The output of amplifier 685 will be the inverted output of the amplifier 681 i.e., a logic high when the generator voltage is less than the bus voltage and a logic low when the bus voltage is less than the generator voltage.

The output of comparator 671 is connected to an input of a two-input raise NOR gate 701 and the output of amplifier 685 is connected to an input of a two-input lower NOR gate 703. The other inputs of gates 701 and 703 are connected to the output of gate 663. The output of gate 701 will be a logic high when the outputs of comparator 671 and gate 663 are at a logic low. In other words, Raise Voltage will be a logic high when the generator voltage is less than the bus voltage and the bus voltage is within the upper and lower limits. Similarly, the output of gate 703 will be a logic high when the outputs of amplifier 685 and gate 663 are at a logic low. In other words, Lower Voltage will be a logic high when the generator voltage is greater than the bus voltage and the bus voltage is within the upper and lower limits.

The Generator Voltage Greater Than Bus Gate includes a two-input NAND gate 711 with one of its inputs connected to the output of amplifier 685. The other input is connected to an output of an optical isolator 713. Isolator 713 is activated when a jumper connected Enable Contact is connected so as to supply a positive OPTO+ supply voltage. An input of the isolator 713 is connected internally to a light emitting diode. The other terminal of this light emitting diode is connected to the common OPTO− of the supply voltage. The OPTO+ and OPTO− supply voltage is produced by a separate supply so that other circuitry in the Synchronizer is isolated from the Voltage Acceptance Circuit 11. When this internal diode emits light, a photo responsive transistor in the isolator 713 will conduct and thus cause a logic high to appear at the output of the isolator 713. The output of gate 711 will always be a logic high if the Enable Contact is not jumpered. When the Enable Contact is jumpered the output of gate 711 will be determined by the output of amplifier 685 i.e., if the generator voltage is greater than the bus voltage, the gate 711 will have a logic high output but if the generator voltage is less than the bus voltage, the gate will have a logic low output.

The generation of the Voltage Inhibit signal will now be described. The output of amplifier 625 is connected to the anode of a diode 721 and the output of amplifier 627 is connected to the anode of a diode 723. The cathodes of diodes 721 and 723 are connected together to produce an output line 725 from the Upper/Lower Limit Comparator which is a logic high if either the upper limit or lower limit is exceeded. Line 725 is connected to the cathode of a diode 727 which has its anode connected to the output of amplifier 595. The line 725 will be at a logic high if the Voltage Difference Comparator has a logic high output indicating that the difference between the bus and generator voltage is greater than the voltage difference set by the potentiometer 599. A two-input NAND gate 729 is connected to invert the logic level on line 725. The output of gate 729 is input to one input of a two-input NAND gate 731. The other input of gate 731 is connected to the output of gate 711. The output of gate 731 is the Voltage Inhibit signal which will at a logic high when the upper limit is exceeded, the lower limit is exceeded, the voltage difference is greater than the voltage difference limit or when the generator voltage is less than the bus voltage (when Enable Contact is jumpered). For convenience the complement of the Voltage Inhibit signal is generated by a NAND gate 733 connected to invert the output of gate 731.

Figure 6A:
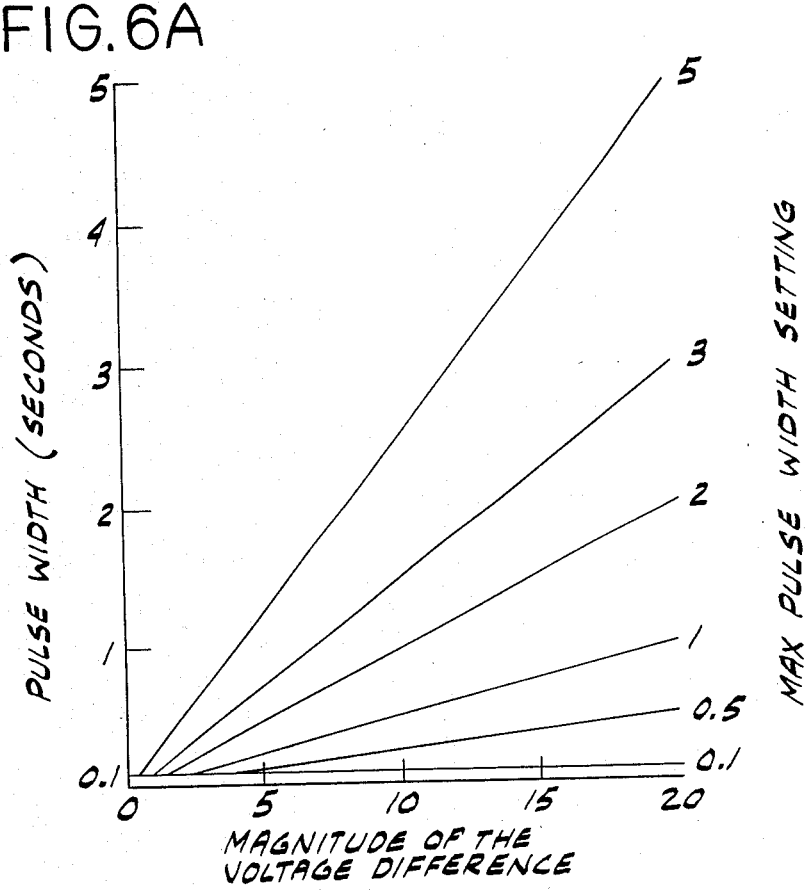
FIGS. 6A and 6B are graphs of the response of the circuit of FIGS. 4A and 4B.
Figure 6B:
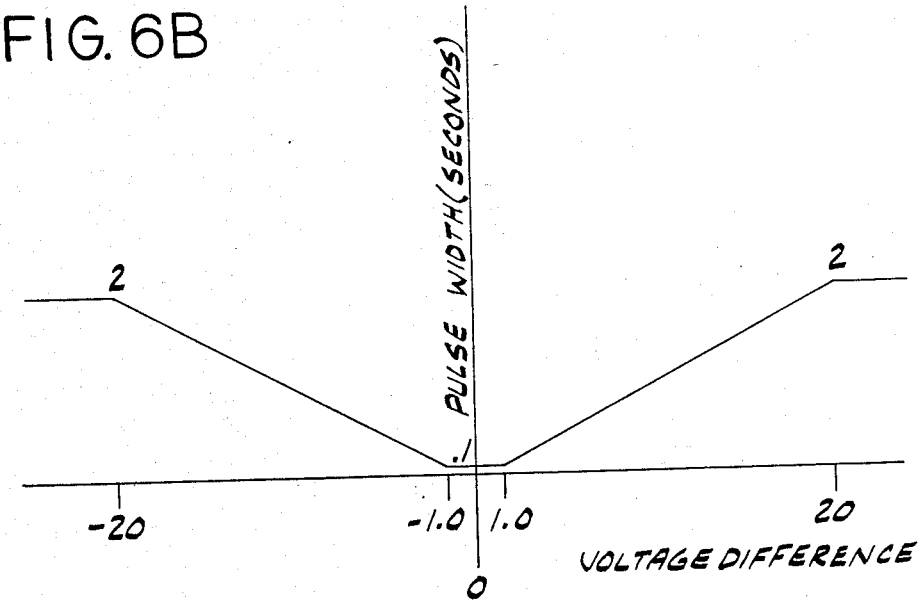

The operation of the Voltage Matching Circuit 21 and the Voltage Acceptance Circuit 11 will now be described along with reference to FIGS. 6A, 6B and 7. The Voltage Acceptance Circuit 11 uses amplifiers 625 and 627 to detect whether or not the bus voltage as sensed by the Bus Rectifier is within the Upper and Lower Limits set on potentiometers 633 and 641. If the limit is exceeded the corresponding High or Low Bus LED 655 or 657 is lit. Circuit 11 also generates the output of the amplifier 553 which is a voltage which value is proportional to the difference between the bus voltage and the generator voltage, which is positive if the bus voltage is greater than the generator voltage and which is negative if the generator voltage is greater than the bus voltage. The output of the amplifier 553 is rectified by the Precision Full Wave Rectifier which output from amplifier 437 is compared by amplifier 595 with a set voltage difference as determined by the wiper setting of potentiometer 599. If the difference is greater than the set difference, the corresponding LED 615 is lit.

Also the Circuit 11 determines whether a raise or lower signal is required to correct the generator voltage. The comparator 671 determines if the output of amplifier 553 is positive (a raise voltage condition). If the output of amplifier 553 is negative, the output of comparator 671 will be a logic high and amplifier 685 will have a logic low output (a lower voltage condition). Raise gate 701 or lower gate 703 will have a logic high output when the corresponding comparator 671 or 685 is at a logic low provided that the output of gate 663 is at a logic low indicating that the bus upper and lower limits have not been exceeded.

The Voltage Inhibit signal is generated using line 725 which is at a logic high when there is either a high bus, low bus or 1–50 volts high. Line 725 is inverted by gate 729 which output is input to gate 731. Gate 731, the output of which is the Voltage Inhibit signal, will be at a logic high when line 725 is at a logic high. Gate 731 will also be at a logic high when the generator voltage is less than the bus voltage (if Enable Contact is jumpered).

In Voltage Matching Circuit 21 the output of the Precision Full Wave Rectifier is representative of the magnitude of the difference between the voltage of the bus and the voltage of the generator. If the voltage difference is greater than some predetermined magnitude, this output is limited to a maximum level by the Max Level Limit circuit. This maximum level e.g., 4.3 volts corresponds to the first predetermined value of the magnitude of the difference e.g., 20 volts.

As shown in FIG. 7, the Interval Pulser will go from a logic high to a logic low at the OUT pin of circuit 261 at a predetermined time interval, as set on the potentiometer 267 (for example a five second interval). At this time, T1, the transistor 231 will go to an off or non-conducting condition and thus remove the discharge path across capacitor 213. The capacitor 213 will begin charging from its discharged condition at the rate determined by the value of the capacitance of capacitor 213 and the magnitude of the current generated by transistor 215 in the Constant Current Generator. The magnitude of the current corresponds to the pulse width of control pulses that will be generated. Thus the Correction Pulse Width Adjustment is used and is calibrated to the maximum pulse width setting shown in FIG. 6A. For example, the maximum pulse width may be set to two seconds.

Also at time T1 the Trigger to the 0.1 Second Wide Pulse Generator is initiated. The TR pin of circuit 243 goes to a logic low and the OUT pin of circuit 243 will go from a logic low to a logic high. Gate 255 will thus make a logic high to a low transition.

Gate 281 will also output a logic high starting at time T1. Assuming the Voltage Inhibit and Remove Correction signals are high, then the Raise Voltage or Lower Voltage will enable either the Raise Output Gate or Lower Output Gate i.e., the output of gate 283 or 285 will go to a logic high. Depending on which of gates 283 or 285 is enabled, either the Raise LED 289 or Lower LED 293 is lit. Additionally, the Raise Voltage Relay Signal or Lower Voltage Relay Signal will go to a logic low and thus a control signal will start for use by the Voltage Regulator.

The capacitor 213 will continue to charge and when the voltage on capacitor 213 exceeds the output of amplifier 171, the comparator 211 output will go to a logic low. The time interval between the start of the capacitor 213 charging and the comparator 211 transition to a logic low is thus proportional to the magnitude of the difference between the magnitude of bus and generator voltages unless the voltage difference is greater than some predetermined magnitude and the output of the Precision Full Wave Rectifier is limited to the maximum level by the Max Level Limit circuit. For example if the maximum pulse width setting is at 2 seconds as shown on FIGS. 6A and 6B and the magnitude of the voltage difference is 15 volts, the capacitor 213 will require 1.5 seconds to charge to the voltage output by the Precision Full Wave Rectifier. And for example, if the magnitude of the difference exceeds 20 volts the capacitor will require 2 seconds (the fixed maximum pulse) to charge to the fixed maximum level.

Gate 255 will go from a logic low to a logic high one tenth of a second after the Interval Pulser started the control pulse. As shown in FIG. 7, the gate 241 will thus go to a logic low output when the comparator 211 goes to logic low at time T2. The output of gate 241 will go low and the Trigger pin TR of circuit 261 will go low. The OUT pin of circuit 261 will return to a logic high and the previously active Raise or Lower Output Gate will be terminated. The Raise or Lower Voltage Output Signal will return to a normally inactive condition.

As the control signals are applied to the Voltage Regulator the voltage of the generator will approach the voltage of the bus as may best be seen in FIG. 7 by the decrease in the Max Level Limit output. As shown in FIGS. 6A and 6B the pulse width will decrease as the magnitude of the voltage difference between the bus and generator decreases along one of the response curves as set by the maximum pulse width setting. FIG. 6B shows one of the response curves for a maximum pulse width setting of 2 seconds, but is presented as a relationship between the voltage difference between the bus and generator and the pulse width.

At time T1' the Interval Pulser will again go from a logic high to a logic low at the OUT pin of circuit 261 (for example a five second interval between T1 and T1'). Another control signal is generated as above but the time required is less than before since the output of amplifier 171 is reduced. The time period between T1' and T2' is thus less than the time period between T1 and T2.

As the magnitude of the voltage difference decreases, the time required to charge capacitor 213 until its voltage exceeds the output of amplifier 171 is reduced. As may best be seen in FIG. 7 for the time period T1" to T2", when the charging of capacitor 213 takes less than 0.1 second, the output of gate 241 will not go to a logic low output until the end of the pulse generated by the 0.1 Second Wide Pulse Generator. Amplifier 211 will however go to a logic high before the end of the 0.1 second time period ended at T2". For example, as shown in FIGS. 6A and 6B, a 0.1 second minimum control pulse or signal will be attained when the magnitude of the voltage difference is below approximately 1.0 volts. Thus, the fixed minimum pulse duration is applied to the Voltage Regulator for magnitudes of voltage difference below the second predetermined value.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An electronic circuit for use with an electrical generator having a voltage regulator which responds to raise or lower control signals produced by control pulses to change the voltage output of the generator, the electronic circuit comprising:
    means for sensing the magnitude of the difference between the voltage output of the generator and the voltage of a bus to which the generator is to be connected; and
    means, responsive to the magnitude of the difference sensed by said means for sensing, for generating control pulses having a pulse duration which is a function of the magnitude of the sensed difference wherein each control pulse has a fixed maximum pulse duration when the magnitude of the difference is greater than a first predetermined value, wherein each control pulse has a pulse duration which decreases with a decreasing magnitude of difference down to a fixed minimum pulse duration at a second and lesser predetermined value of the magnitude of difference when the magnitude of the sensed difference is less than the first predetermined value, and wherein each control pulse has the minimum pulse duration when the magnitude of the difference is less than the second predetermined value, whereby the control pulses produce the raise or lower control signals for the voltage regulator to cause the voltage output of the generator to approach the voltage of the bus.

2. An electronic circuit as set forth in claim 1 further comprising means for sensing whether the voltage output of the generator is lower or higher than the voltage of the bus, and means responsive to the control pulses and the last said sensing means for producing raise or lower control signals respectively for the voltage regulator to cause the voltage output of the generator to approach the voltage of the bus.

3. An electronic circuit as set forth in claim 2 further comprising means for generating an inhibit signal when the voltage of the bus is above a predetermined high limit or below a predetermined low limit and said means for producing raise or lower control signals includes means responsive to the inhibit signal for terminating the control signals.

4. An electronic circuit as set forth in claim 2 further comprising means for generating an inhibit signal when the magnitude of the difference is above a predetermined maximum and said means for producing raise or lower control signals includes means responsive to the inhibit signal for terminating the control signals.

5. An electronic circuit as set forth in claim 1 further comprising means for sensing whether the difference between the voltage output of the generator and voltage of the bus is positive or negative to produce a corresponding lower or raise digital signal, and means responsive to the control pulses and the digital signal for producing the raise or lower control signals for the voltage regulator to cause the voltage output of the generator to approach the voltage of the bus.

6. An electronic circuit as set forth in claim 1 wherein the means for generating control pulses includes a source of constant magnitude current, means for periodically initiating each of the control pulses, means responsive to the initiating means for storing the current to produce a voltage which increases at a constant rate and means for comparing the magnitude of the produced voltage with the magnitude of the difference sensed and for terminating the control pulses when the magnitude of the produced voltage attains the magnitude of the difference sensed if the magnitude of the difference is less than the first predetermined value and greater than the second predetermined value thereby to generate control pulses which decrease in duration with a decreasing magnitude of difference.

7. An electronic circuit as set forth in claim 6 wherein the means for generating control pulses includes means for sensing the end of a predetermined time period starting when the control pulse is initiated, the predetermined time period corresponding to the fixed minimum pulse duration, and means responsive to the comparing means and the last named sensing means for terminating the control pulses when the magnitude of the produced voltage attains the magnitude of the difference sensed or at the end of the predetermined time period, whichever occurs later, thereby to generate control pulses of the minimum pulse duration for magnitudes of the difference less than the second predetermined value.

8. An electronic circuit as set forth in claim 7 wherein the means for sensing the magnitude of the difference includes means for producing a first voltage which is representative of the magnitude of the difference between the voltage output of the generator and the voltage of the bus to which the generator is to be connected until the magnitude of the difference exceeds the first predetermined value, whereupon the first voltage is maintained at a predetermined maximum level when the magnitude of the difference is greater than the first predetermined value and wherein the comparing means compares the first voltage with the voltage produced by the storing means whereby when the magnitude of the difference is greater than the first predetermined value, control pulses of the fixed maximum pulse duration are maintained.

9. An electronic circuit as set forth in claim 8 wherein the storing means includes a capacitor and a discharge path therefor and further comprising switch means responsive to the initiating means for disconnecting the capacitor from the discharge path.

10. An electronic circuit as set forth in claim 1 wherein the generating means includes timing means to initiate the control pulses at predetermined time intervals.

11. An electronic circuit as set forth in claim 1 wherein said generating means includes means for proportionally decreasing the pulse duration with the magnitude of the difference when the magnitude of the difference is less than the first predetermined value.

12. An electronic circuit as set forth in claim 1 wherein said sensing means includes a bus rectifier for producing a first direct current signal proportional to the bus voltage, a generator rectifier for producing a second direct current signal proportional to the generator voltage, a balance circuit for generating a difference signal proportional to the difference of the first and second direct current signals, and a full wave rectifier connected to the balance circuit for generating a magnitude signal proportional to the magnitude of the difference signal, the magnitude signal thereby being representative of the difference between the voltage output of the generator and the voltage of the bus to which the generator is to be connected.

13. An electronic circuit for use with an electrical generator having a voltage regulator which responds to raise or lower control signals to change the voltage output of the generator, the electronic circuit comprising:

means for producing a first voltage having a magnitude which is representative of the magnitude of the difference between the voltage output of the generator and the voltage of a bus to which the generator is to be connected when the magnitude of the difference is less than a first predetermined value, and having a magnitude which is maintained at a predetermined maximum level when the magnitude of the difference is greater than the first predetermined value; and means responsive to the first voltage for generating control pulses, the generating means including:

a source of constant magnitude current;

means for periodically initiating each control pulse;

means responsive to the initiating means for storing the current to produce a voltage which increases at a constant rate;

means for comparing the magnitude of the produced voltage with the magnitude of the first voltage to terminate the control pulse when the magnitude of the produced voltage attains the magnitude of the first voltage whereby when the latter is at its predetermined maximum level and the magnitude of the difference is greater than the first predetermined value control pulses of the fixed maximum pulse duration are maintained but if the magnitude of the difference is less than the first predetermined value and greater than a second predetermined value, the control pulses decrease in duration with a decreasing magnitude of difference;

means for sensing the end of a predetermined time period starting when the control pulse is initiated, the predetermined time period corresponding to a fixed minimum pulse duration; and means response to the comparing means and the sensing means for terminating the control pulses when the magnitude of the produced voltage attains the magnitude of the first voltage or at the end of the predetermined time period, whichever occurs later, thereby to generate control pulses of the minimum pulse duration for magnitudes of the difference less than the second predetermined value, whereby the control pulses produce the raise or lower control signals for the voltage regulator to cause the voltage output of the generator to approach the voltage of the bus.

14. An electronic circuit as set forth in claim 13 wherein the initiating means includes timing means to initiate the control pulses at predetermined time intervals.

15. An electronic circuit as set forth in claim 14 wherein the storing means includes a capacitor and a discharge path therefor and further comprising switch means responsive to the initiating means for disconnecting the capacitor from the discharge path.

16. An electronic circuit as set forth in claim 13 further comprising means for sensing whether the voltage output of the generator is lower or higher than the voltage of the bus, and means responsive to the control pulses and the last said sensing means for producing raise or lower control signals respectively for the voltage regulator to cause the voltage output of the generator to approach the voltage of the bus.

17. An electronic circuit as set forth in claim 16 further comprising means for generating an inhibit signal when the voltage of the bus is above a predetermined high limit or below a predetermined low limit and said means for producing raise or lower control signals includes mans responsive to the inhibit signal for terminating the control signals.

18. An electronic circuit as set forth in claim 16 further comprising means for generating an inhibit signal when the magnitude of the difference is above a predetermined maximum and said means for producing raise or lower control signals includes means responsive to the inhibit signal for terminating the control signals.

19. An electronic circuit as set forth in claim 13 further comprising means for sensing whether the difference between the voltage output of the generator and voltage of the bus is positive or negative to produce a corresponding lower or raise digital signal, and means responsive to the control pulses and the digital signal for producing the raise or lower control signals for the voltage regulator to cause the voltage output of the generator to approach the voltage of the bus.

20. An electronic circuit as set forth in claim 13 wherein said producing means includes a bus rectifier for producing a first direct current signal proportional to the bus voltage, a generator rectifier for producing a second direct current signal proportional to the generator voltage, a balance circuit for generating a difference signal proportional to the difference of the first and second direct current signals, and a full wave rectifier connected to the balance circuit for generating a magnitude signal proportional to the magnitude of the difference signal, the magnitude signal thereby being representative of the difference between the voltage output of the generator and the voltage of the bus to which the generator is to be connected.

* * * * *